United States Patent [19]

Mathers et al.

[11] 4,191,662

[45] Mar. 4, 1980

[54] $Y_2O_3$:EU PHOSPHOR HAVING INCREASED BRIGHTNESS

[75] Inventors: James E. Mathers; Ramon L. Yale, both of Ulster, Pa.

[73] Assignee: GTE Sylvania Incorporated, Stamford, Conn.

[21] Appl. No.: 942,085

[22] Filed: Sep. 13, 1978

[51] Int. Cl.$^2$ .............................................. C09K 11/46
[52] U.S. Cl. .............................................. 252/301.4 R
[58] Field of Search ................................ 252/301.4 R

[56] References Cited

U.S. PATENT DOCUMENTS

| | | | |
|---|---|---|---|
| 3,291,747 | 12/1966 | Lefevev et al. | 252/301.4 R |
| 3,368,980 | 2/1968 | Avella et al. | 252/301.4 R |

FOREIGN PATENT DOCUMENTS 2349160  4/1975  Fed. Rep. of Germany .... 252/301.4 R

*Primary Examiner*—Jack Cooper
*Attorney, Agent, or Firm*—John C. Fox

[57] ABSTRACT

$Y_2O_3$:Eu red-emitting phosphor exhibits up to about 8 percent brightness increase upon cathode ray excitation and about 3 percent brightness increase upon UV excitation by the addition of about 250 parts per million of Mg(as MgO).

2 Claims, 1 Drawing Figure

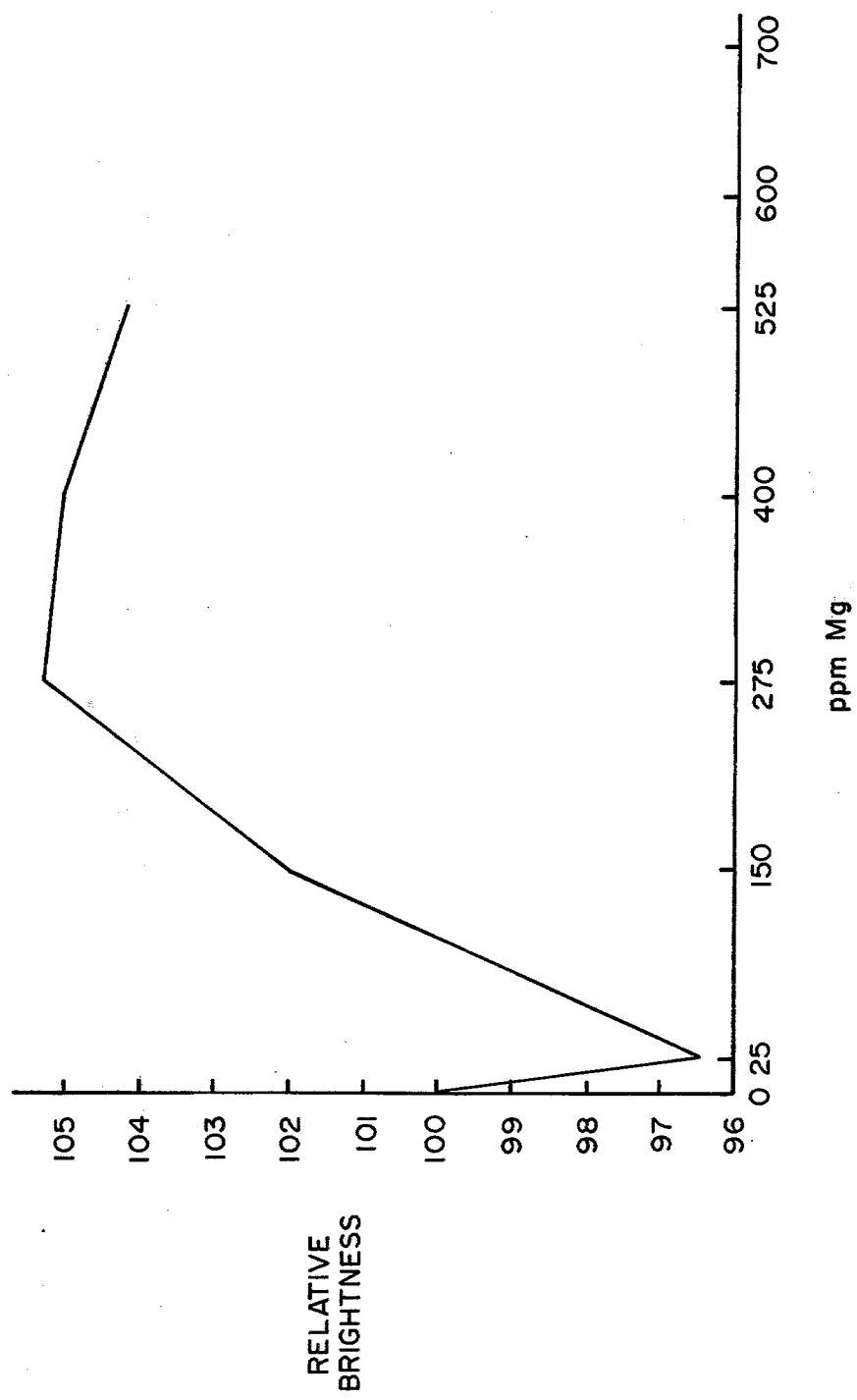

$Y_2O_3$:EU PHOSPHOR HAVING INCREASED BRIGHTNESS

BACKGROUND OF THE INVENTION

1. Field of the Invention

This invention relates to $Y_2O_3$:Eu phosphors, and more particularly relates to such phosphors containing MgO and having increased brightness.

2. Prior Art

During the early development of the modern shadow mask tri-color cathode ray tube for color television, a chief problem was poor brightness, since about 85 percent of the beam current was masked and thereby not available to provide excitation energy to the screen. With the introduction of the "all-sulfide" color tube about 1961, (see U.S. Pat. No. 2,991,383, issued to A. E. Hardy, July 4, 1961) some improvement was realized in this and other regards. However, such a tube still had marginal brightness and other shortcomings. In June of 1964, the "rare earth" tube, that is, a tube employing a Eu-activated rare earth red phosphor, was introduced. See *Television Digest*, Vol. 4, No. 23, p. 7, June 8, 1964. Such a tube exhibited improved white brightness, increased linearity of color response, and increased linearity of brightness, and as a result enjoyed remarkable commercial success. See *The Wall Street Journal*, May 12, 1965, page 1; and *Chemical and Engineering News*, June 12, 1967, pp. 46–68. Of three early examples of the rare earth red phosphor; yttrium oxide ($Y_2O_3$:Eu), yttrium oxysulfide ($Y_2O_2S$:Eu), and yttrium orthovanadate, ($YVO_4$:Eu), $Y_2O_3$:Eu is presently preferred by some for its greater brightness and freedom from sulfur, the presence of which could lead to handling, recovery and/or disposal problems. Over the years, various techniques have been employed to improve the $Y_2O_3$:Eu phosphor. See U.S. Pat. Nos.: 3,759,835 and 3,574,131 (process for making); 3,582,493 and 3,635,658 (control of particle size; 3,637,517 and 3,684,546 (control of purity); 3,619,265 and 3,740,250 (improved screen adherence; 3,607,371 (increased bulk density); 3,574,130 and 3,830,748 (control of brightness); 3,870,650 (improved crystallinity); 3,711,418 (control of decay time); and 3,676,177 (process for screening), all assigned to the present assignee. Efforts to further improve this phosphor hold the promise of improved color tube performance.

SUMMARY OF THE INVENTION

In accordance with the invention, it has been discovered that the presence of from about 100 to 800 parts per million of Mg as MgO to $Y_2O_3$: Eu results in about a 5 to 8 percent brightness increase upon cathode ray excitation and about a 3 percent brightness increase upon UV excitation, while maintaining chromaticity and particle size. Such phosphor is useful, for example, as the red component in tri-color cathode ray tubes for color television, or in mercury vapor discharge lamps. Devices incorporating this phosphor form a part of the invention.

BRIEF DESCRIPTION OF THE DRAWING

The FIGURE is a graph of relative brightness in a cathode ray tube of $Y_2O_3$:Eu phosphors versus Mg content in parts per million of the phosphors.

DETAILED DESCRIPTION OF THE INVENTION

For a better understanding of the present invention, together with other and further objects, advantages and capabilities thereof, reference is made to the following disclosure and appended claims in connection with the above described drawing.

The $Y_2O_3$:Eu phosphor may be expressed as $(Y_{1-x}Eu_x)_2O_3$ where x is within the range of about 0.010 to 0.10, and preferably 0.030 to 0.050. The preparation of the $Y_2O_3$:Eu phosphor is adequately described in the prior art, and is thus not a necessary part of this description.

The phosphor is excited by electrons, low energy and high energy photons, and emits bright red within the wavelength range of about 611 nanometers to 613 nanometers. It is thus useful in a variety of luminescent devices, such as the tri-color cathode ray tube, and low pressure mercury vapor discharge lamps.

EXAMPLE $MgCo_3$ was added to yttrium-europium nitrate solutions, then oxalates were precipitated. The precipitates were calcined to oxides at about 850° C. and then fired at about 1200° C. for about 2 hours. Chemical analysis by atomic absorption of the resulting phosphors correlates well with the added amount of Mg, as may be seen from Table I.

TABLE I

| Sample No. | Mg(ppm) Added | Mg(ppm) Analyzed |
|---|---|---|
| 1 | 0 | 50 |
| 2 | 25 | 80 |
| 3 | 150 | 175 |
| 4 | 275 | 300 |
| 5 | 400 | 415 |
| 6 | 525 | 525 |

Europium was present in each sample in the amount of about 4 mole percent of the cation content, i.e. $(Y_{0.96}Eu_{0.04})_2O_3$. The samples were tested for brightness against three different production control lots by the following procedure:

Plaques for testing were prepared by settling the powdered phosphor materials to optimum light output on $1\frac{1}{2}" \times 1\frac{1}{2}"$, optically clear pyrex glass, using a cushion of deionized water and a barium acetate-potassium silicate binder system. These phosphor plaques were then measured for brightness, utilizing a demountable cathode ray tube operating at 12 KV anode voltage, 6 ua beam current. Light-output was measured with an eye-corrected photocell.

Table II shows the brightness of Mg-doped phosphors relative to undoped production lots, under cathode ray and UV excitation.

TABLE II

| Mg (ppm) Added | (cathode ray excitation) Relative Brightness Versus | | | (254 Nanometers Hg Excitation) Relative Quantum Efficiency Versus |
|---|---|---|---|---|
| | Lot 1 | Lot 2 | Lot 3 | Lot 3 |
| 0 | 103.5 | 102.2 | 100.4 | 115.4 |
| 25 | 99.9 | 98.6 | 96.9 | 117.6 |
| 150 | 105.6 | 104.2 | 102.4 | 116.0 |
| 275 | 109.0 | 107.6 | 105.7 | 118.4 |
| 400 | 108.7 | 107.3 | 105.4 | 116.1 |
| 525 | 107.8 | 106.5 | 104.6 | 116.6 |

The cathode ray brightness results are illustrated graphically in the FIGURE, wherein brightness relative to undoped $Y_2O_3$:Eu set at 100 percent is plotted versus Mg content in parts per million. As may be seen, brightness increases to a maximum at about 275 parts per million and thereafter decreases. Based upon such considerations, it is preferred to maintain Mg within the narrower range of about 225 to 525 parts per million.

Table III shows that particle size remains relatively unaffected by the Mg additions.

TABLE III

| Sample No. | Mg(ppm) Added | Part. Size (FSSS) |
| --- | --- | --- |
| 1 | 0 | 3.80 |
| 2 | 25 | 3.89 |
| 3 | 150 | 3.24 |
| 4 | 275 | 3.75 |
| 5 | 400 | 3.88 |
| 6 | 525 | 3.81 |

TABLE III-continued

While there has been shown and described what are at present considered the preferred embodiments of the invention, it will be obvious to those skilled in the art that various changes and modifications may be made therein without departing from the scope of the invention as defined by the appended claims.

What is claimed is:

1. A phosphor composition consisting essentially of $(Y_{1-x}Eu_x)_2O_3$, wherein x is within the range of about 0.01 to 0.10, and from about 100 to 800 parts per million of Mg as MgO, and exhibiting increased brightness upon cathode ray and UV excitation relative to said composition without Mg.

2. The composition of claim 1 wherein Mg is present in the amount of about 225 to 525 parts per million.